United States Patent
Åkesson

Patent Number: 5,692,570
Date of Patent: Dec. 2, 1997

[54] HOOF PAD

[76] Inventor: Lars Åkesson, Bäckholmen, Drakmöllavägen 101, S-297 95, Degeberga, Sweden

[21] Appl. No.: 537,870

[22] PCT Filed: Apr. 28, 1994

[86] PCT No.: PCT/SE94/00379

§ 371 Date: Jan. 30, 1996

§ 102(e) Date: Jan. 30, 1996

[87] PCT Pub. No.: WO94/24855

PCT Pub. Date: Nov. 10, 1994

[30] Foreign Application Priority Data

Apr. 29, 1993 [SE] Sweden .............. 9301443

[51] Int. Cl.⁶ .............................................. A01L 5/00
[52] U.S. Cl. ................................................ 168/28
[58] Field of Search ........................ 168/14, 26, 28

[56] References Cited

U.S. PATENT DOCUMENTS

| 28,473 | 5/1860 | Hale | 168/28 |
| 594,080 | 11/1897 | Hennessy | 168/28 |
| 646,148 | 3/1900 | Kent | 168/28 |
| 809,144 | 1/1906 | Singleton | 168/28 |
| 895,994 | 8/1908 | Fawkes | |
| 1,100,670 | 6/1914 | Curley | 168/28 |
| 4,573,538 | 3/1986 | Figueras | 168/14 |

FOREIGN PATENT DOCUMENTS

| 15747 | 3/1912 | Denmark | 168/14 |
| 23868 | 6/1894 | United Kingdom | |
| 187294 | 10/1922 | United Kingdom | 168/28 |

*Primary Examiner*—Robert P. Swiatek
*Attorney, Agent, or Firm*—Browdy and Neimark

[57] ABSTRACT

A hoof pad arranged under the hoof of a horse. The hoof pad comprises a hollow body (1) and a valve (2) connected to the body (1), for controlling an inner pressure in the hoof pad. The valve (2) is essentially made of a flexible material. A rear portion (12) of the hoof pad is made of a material that is less extensible at a certain inner pressure than the major part of the hoof pad.

7 Claims, 1 Drawing Sheet

5,692,570

HOOF PAD

BACKGROUND OF THE INVENTION

1. Technical Field of the Invention

The present invention relates to a hoof pad.

Horses used in man's service, for competitions or otherwise, are equipped with horseshoes. Actually it is unnatural for a horse to be shod, since this changes the function of the hoof mechanism. As a result, the body of the horse is more readily injured. The frog of an unshod hoof is subjected to pressure, which is necessary to make the natural hoof mechanism function. If the hoof is shod, the frog, which is fairly centrally located in the rear half of the hoof, very seldom touches the ground. One way of coping with this problem is to provide the hoof with a hoof pad which more or less fills the space between the ground and the parts of the hoof which are not covered by the horseshoe.

2. Prior Art

Hoof pads are known, one being disclosed in Patent Specification GB-187,294. However, this hoof pad suffers from a number of drawbacks. Its heart shape deteriorates its effect to a considerable extent since, as mentioned above, the frog is the part which first of all needs to be stimulated. The position of the valve and the fact that it is made of metal imply a great risk of further injuries to the hoof. Prior art hoof pads do not provide the intended support, since the rear part of the hoof pad is extended more than the rest of the hoof pad, due to the fact that this rear part is not supported by the horseshoe when the hoof hits the ground (and the hoof pad is subjected to load). This problem is caused by an incorrect design of the hoof pad. The design is unnecessarily complicated and, thus, costly.

OBJECT AND SUMMARY OF THE INVENTION

The object of the present invention is to provide a hoof pad which eliminates the drawbacks of prior art and permits the shod hoofs of the horse to function in a natural fashion, i.e. in essentially the same manner as without shoes.

In a preferred embodiment, the hoof pad comprises a circumferential flange which can be arranged between the hoof and a horseshoe. The circumferential flange of this embodiment eliminates one disadvantage of the technique disclosed in the above-mentioned patent specification, in which the hoof pad can only be used together with a "bag" attached to the horseshoe, into which the hoof pad is inserted.

BRIEF DESCRIPTION OF THE DRAWINGS

A preferred embodiment of the inventive hoof pad will now be described in more detail with reference to the accompanying drawings in which.

DETAILED DESCRIPTION OF THE PREFERRED EMBODIMENT(S) OF THE INVENTION

Figure 2:
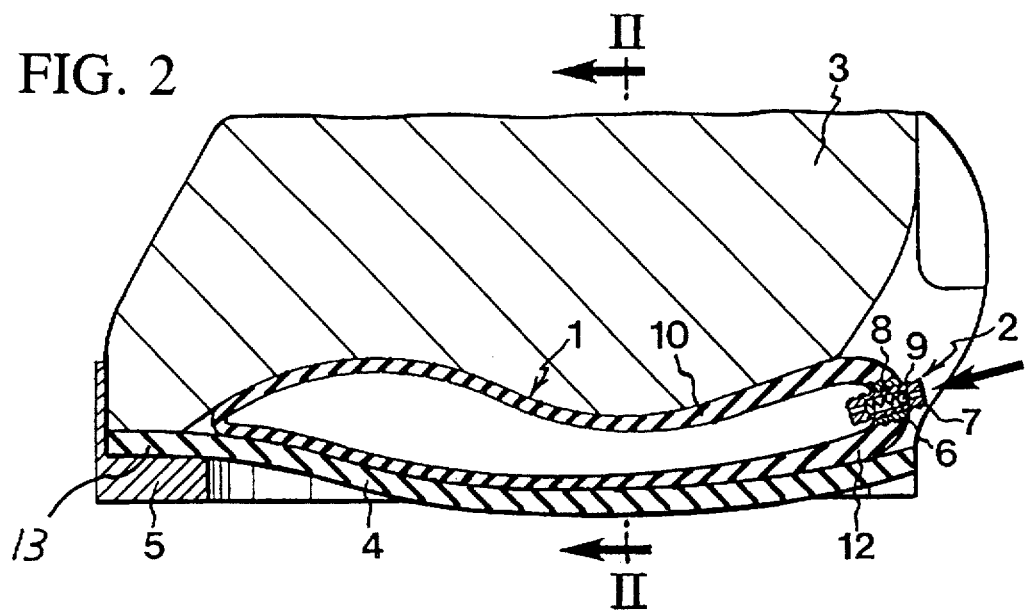
FIG. 2 is a longitudinal section of the hoof, horseshoe, outsole and hoof pad, according to FIG. 1, when assembled.
Figure 3:
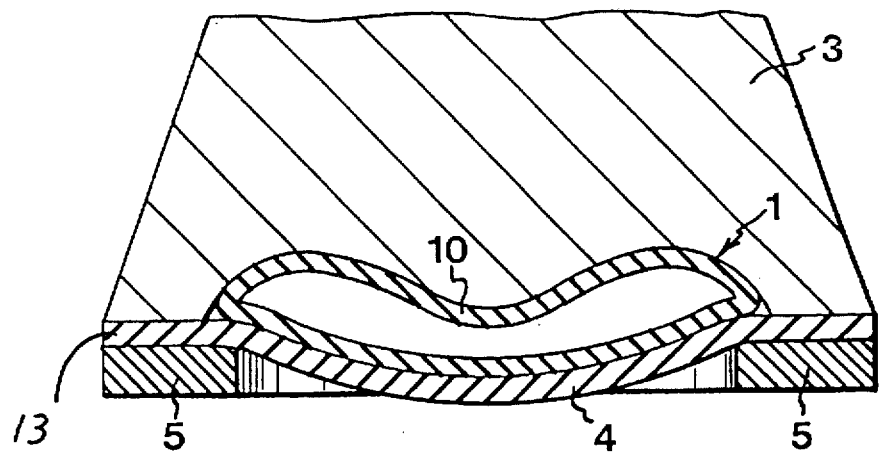
FIG. 3 is a cross-section of the hoof pad when assembled according to FIG. 2.
Figure 1:
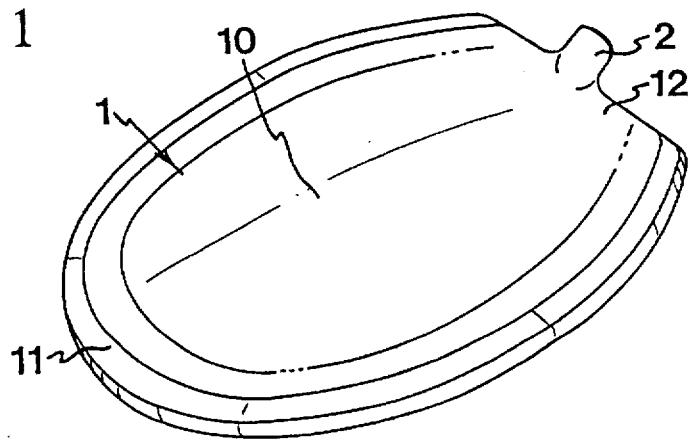
FIG. 1 is a perspective view of the hoof pad according to the preferred embodiment of the invention.

FIG. 1 illustrates a preferred embodiment of the inventive hoof pad. The hoof pad essentially comprises a hollow body 1 and is provided with a valve 2 for controlling an inner pressure in the hoof pad. This pressure is obtained by supplying air, oil, water or some other fluid to the hollow body via the valve 2. The circumference of the hollow body or bladder 1 is essentially shaped as a horseshoe. The valve 2 is arranged at the rear end of the bladder, i.e. the end of the bladder which is to be found at the rear end of the hoof 3 when the hoof pad is mounted on the hoof 3, as shown in FIG. 2. According to this preferred embodiment, the bladder 1 is arranged in a space between the hoof 3 and an outsole 4 which is connected to the horseshoe 5 along flange 13. Preferably, the connection of the outsole 4 with the horseshoe 5 continuously extends from one end to the other of the horseshoe 5. The connection preferably is a glue joint. A solution according to the above-mentioned prior art technique does not function in practice, since the bladder comes loose, in any case at the rear portions of the horseshoe where it is only squeezed between the horseshoe and the hoof, owing to the forces arising as the horse moves. A glue joint solves this problem.

The bladder 1 is preferably made of a rubber material, but other stretchable and elastic materials may also be used.

The valve 2 essentially consists of a soft, elastic material which may be the same as the material of the bladder 1, or some other suitable, pliable and flexible material. This eliminates the risk of chafing the hoof 3 owing to the valve 2 being made of some hard material such as metal. According to this preferred embodiment of the hoof pad according to the invention, the valve 2 comprises a tubular outer casing 6 of a rubber material. The casing 6 is formed with an internal thread and is connected to the wall of the bladder 1. The interior of the valve 2 is an inner tubular casing 7 which is formed with an external thread and a pressure barrier in the form of an inner seat, a return spring 8 and a ball 9. The return spring 8 and the ball 9 are arranged in the seat. In this case, the valve 2 thus is a check valve and the interior is screwed into the outer casing 6. Thus, the interior can easily be unscrewed and cleaned, which is an advantage since the valve may be clogged with dirt. As shown in the Figures, at least part of the valve 2 extends into the bladder 1. Owing to the flexible design of the valve 2, this part is also movable, which further reduces the risk of injuries to the soft parts of the hoof, since the valve can "settle". A very favourable alternative is a check valve which is completely made of a rubber material and of which at least part extends into the cavity of the body 1. This inwardly extending part of the valve is of a shape which passes from cylindrical to a flattened cylinder towards its inner mouth. This alternative of the valve 2 provides "automatic" closing of the valve when the pressure inside the cavity exceeds the pressure outside the body 1.

As mentioned above, one of the drawbacks of the prior art technique is that it has not been taken into consideration that the rear end of the bladder is not supported by the horseshoe. This results in extra stretch of the wall at the rear end of the bladder as the hoof hits the ground, and a significant decrease of the effect of the hoof pad owing to this deformation of the bladder causing unfavourable distribution of the air in the bladder. Thus, the bladder bulges backwards at the rear end, which means that the pressure under the hoof becomes lower than intended. As a result, the positive effect on the blood circulation and other important functions in the leg and hoof of the horse will be considerably smaller. In the preferred embodiment of the hoof pad according to the invention, this defect has been eliminated by the wall 10 of the hoof pad being formed with a thickness which increases from the front end 11 of the hoof pad to the rear end 12 thereof. A suitable ratio of the thickness of the rear end 12 to that of the front end 11 is 1.5–20:1, preferably 2–10:1, most advantageously 3–5:1. As an example, it may be mentioned that a bladder 1 of the same material as the inner tube of a car tire has a maximum wall thickness of 3.5 mm (at the rear end 12 of the bladder). The thickness decreases towards the front end 11 of the bladder and will have a minimum of 0.9 mm. In an alternative embodiment, the rear portion 12 of the hoof pad is made thicker than the major part thereof, which reduces the stretch of the hoof pad when subjected to load. This greater thickness extends along up to ⅓ of the length of the bladder 1, preferably along about ⅕ of the length of the bladder 1 (from its rear edge and forwards). The stretch of this portion is preferably less than half of the stretch in the rest of the bladder 1 (except the actual flange, if any, see below). This may of course be achieved by making the material of the wall 10 of the rear portion 12 more rigid in some other manner. As a result, the hoof pad always has its optimum shape. In a further alternative embodiment, the bladder 1 is fitted with a flange which extends along the circumference of the bladder 1 except at the rear end. The bladder is made of two halves which are vulcanised together, thereby forming the flange. The width of the flange corresponds to about the width of a standard-type horseshoe. The flange allows simple attachment of the hoof pad to the hoof as the horseshoe is mounted, the flange of the hoof pad being glued to the horseshoe, whereupon the horseshoe is positioned to abut against the hoof pad and is nailed (or fastened in some other similar manner) to the hoof. The horseshoe covers the flange wholly or partly. This way of arranging the hoof pad on the hoof 3 provides safe fixing. The flange is of such a width that one and the same hoof pad can be used for hoofs 3 of different size and shape. This makes the manufacture of the hoof pad less expensive since it is only necessary to produce a limited number of sizes. Also the extensibility of the material increases this flexibility.

The hoof pad described above can be used in many fields. The preferred embodiment will be very useful in equestrian sports, since the hoof pad is easy to remove from the hoof for cleaning of both the hoof pad and the space between the outsole and the hoof. Also the valve 2 is easy to clean since the insert can be unscrewed. All the embodiments described above satisfy a great demand for medical fittings for horses suffering from founders or some other hoof/leg-related injury. Here, the last-mentioned embodiment, in which the bladder 1 is fitted with a flange, may in some cases be preferred.

The embodiments described above are merely examples and in no way limiting. Modifications are feasible within the scope of the invention, as defined in the accompanying claims. For example, the entire valve may be arranged outside, which however is not very practical.

I claim:

1. Hoof pad adapted to be applied to a hoof of a horse which hoof has a frog portion, said hoof pad comprising a hollow body (1) and a valve (2) connected to the body (1), for controlling an inner pressure in the hoof pad, characterized in that the valve (2) is substantially made of a pliable material, and that a rear portion (12) of the hoof pad is made of a material of less extensibility at a certain inner pressure than the major part of the hoof pad, said hollow body formed to abut the frog portion of the hoof when the hoof pad is applied to the frog portion.

2. Hoof pad as claimed in claim 1, characterized by a circumferential flange which is arrangeable between the hoof (3) and a horseshoe (5).

3. Hoof pad as claimed in claim 1, characterized in that the thickness of the material of said hoof pad increases towards the rear end (12) of said hoof pad.

4. Hoof pad as claimed in claim 1, characterized in that a wall (10) of said hoof pad essentially has two different thicknesses, the wall (10) in a rear portion (12) having a greater thickness than the rest of the wall (10).

5. Hoof pad as claimed in claim 1, in which the valve (2) extends into the cavity of said body (1), characterized in that the part of the valve (2), which extends into the cavity, is largely shaped as a flattened cylinder and is substantially made of a pliable material for establishing a closure of its inner mouth when subjected to a pressure inside the cavity which exceeds the pressure outside the body (1).

6. Hoof pad as claimed in claim 1, characterized in that the valve (2) comprises an outer casing (6) connected to the body and an inner casing (7) which is mountable in the outer casing (6) and removable therefrom and which accommodates a pressure barrier.

7. Hoof pad as claimed in claim 1, wherein a wall of said hollow body abutting the frog portion is spaced apart from an opposite wall forming the hollow body.

\* \* \* \* \*